US010658895B2

(12) United States Patent
Higashino et al.

(10) Patent No.: US 10,658,895 B2
(45) Date of Patent: May 19, 2020

(54) ROTARY ELECTRIC MACHINE

(71) Applicant: MITSUBISHI ELECTRIC CORPORATION, Chiyoda-ku (JP)

(72) Inventors: Hiroyuki Higashino, Chiyoda-ku (JP); Yoshiaki Kitta, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 389 days.

(21) Appl. No.: 15/564,040

(22) PCT Filed: May 13, 2016

(86) PCT No.: PCT/JP2016/064271
§ 371 (c)(1),
(2) Date: Oct. 3, 2017

(87) PCT Pub. No.: WO2016/186024
PCT Pub. Date: Nov. 24, 2016

(65) Prior Publication Data
US 2018/0091011 A1    Mar. 29, 2018

(30) Foreign Application Priority Data

May 15, 2015    (JP) .................................. 2015-100133

(51) Int. Cl.
*H02K 1/32*    (2006.01)
*H02K 1/27*    (2006.01)
(Continued)

(52) U.S. Cl.
CPC ............. *H02K 1/32* (2013.01); *H02K 1/2766* (2013.01); *H02K 9/005* (2013.01); *H02K 9/197* (2013.01); *H02K 9/19* (2013.01); *H02K 15/03* (2013.01)

(58) Field of Classification Search
CPC ........ H02K 15/03; H02K 9/005; H02K 9/197; H02K 9/19
See application file for complete search history.

(56) References Cited

U.S. PATENT DOCUMENTS

2012/0299404 A1*  11/2012  Yamamoto ........... H02K 1/2766
                                                                310/61
2013/0020889 A1*   1/2013  Yamamoto ........... H02K 1/2766
                                                                310/59
(Continued)

FOREIGN PATENT DOCUMENTS

JP          48-76402 U1      9/1973
JP        2002-345188 A     11/2002
(Continued)

OTHER PUBLICATIONS

International Search Report dated Jul. 19, 2016, in PCT/JP2016/064271 filed May 13, 2016.

*Primary Examiner* — Jue Zhang
(74) *Attorney, Agent, or Firm* — Oblon, McClelland, Maier & Neustadt, L.L.P.

(57) ABSTRACT

Coolant flow channels include a main flow channel that is spaced apart from a magnet accommodating aperture on an inner circumferential side, and that passes axially through a rotor core; a magnet cooling flow channel that is formed on an inner circumferential side of a permanent magnet, an inner circumferential surface of the permanent magnet being a portion of the magnet cooling flow channel; and a relay flow channel that passes axially through the rotor core in a state in which the main flow channel and the magnet cooling flow channel are linked, a first end plate opens a first axial end of the main flow channel, and closes a first axial end of the magnet cooling flow channel and the relay flow channel, and a second end plate opens second axial ends of the main flow channel, the magnet cooling flow channel, and the relay flow channel.

7 Claims, 10 Drawing Sheets

(51) Int. Cl.
*H02K 9/00* (2006.01)
*H02K 9/197* (2006.01)
H02K 9/19 (2006.01)
H02K 15/03 (2006.01)

(56) References Cited

U.S. PATENT DOCUMENTS

| | | | |
|---|---|---|---|
| 2013/0342049 A1* | 12/2013 | Stridsberg | H02K 1/32 |
| | | | 310/58 |
| 2014/0175916 A1* | 6/2014 | Chamberlin | H02K 9/19 |
| | | | 310/54 |
| 2015/0042099 A1* | 2/2015 | Muniz Casais | H02K 1/2773 |
| | | | 290/55 |
| 2015/0171699 A1* | 6/2015 | Kirkley, Jr. | H02K 1/32 |
| | | | 310/54 |
| 2015/0318764 A1* | 11/2015 | Baba | H02K 9/19 |
| | | | 310/54 |
| 2016/0226355 A1* | 8/2016 | Arita | H02K 21/44 |
| 2016/0261158 A1 | 9/2016 | Horii et al. | |

FOREIGN PATENT DOCUMENTS

| | | | |
|---|---|---|---|
| JP | 2006-067777 A | 3/2006 | |
| JP | 2011-097725 A | 5/2011 | |
| JP | 2012-105487 A | 5/2012 | |
| JP | 2014-187834 A | 10/2014 | |

\* cited by examiner

ROTARY ELECTRIC MACHINE

TECHNICAL FIELD

The present invention relates to a rotary electric machine that has a rotor in which permanent magnets are embedded, and particularly relates to a cooling construction for the permanent magnets.

BACKGROUND ART

Conventional rotary electric machines include: a plurality of permanent magnet pairs that are disposed at a uniform angular pitch circumferentially so as to be arranged in V shapes; a plurality of axial coolant flow channels that extend axially so as to be disposed at a plurality of circumferential positions; and a plurality of radially inner connecting coolant flow channels that are connected to each of the axial coolant flow channels so as to allow the refrigerant that is supplied from inside the rotating shaft to flow toward each of the axial coolant flow channels, each of the axial coolant flow channels being disposed so as to be biased toward only a permanent magnet that is on a first side in the direction of rotation in each of the permanent magnet pairs (see Patent Literature 1, for example).

CITATION LIST

Patent Literature

Patent Literature 1; Japanese Patent Laid-Open No. 2014-187834 (Gazette)

SUMMARY OF THE INVENTION

Problem to Be Solved By the Invention

In the conventional rotary electric machine that is described in Patent Literature 1, because the axial coolant flows are disposed so as to be biased toward only a permanent magnet that is on a first side in the direction of rotation in the permanent magnet pairs that are disposed in V shapes, one problem has been that permanent magnet cooling performance is reduced compared to when the axial refrigerant flows are disposed on both of the permanent magnets in the permanent magnet pairs that are disposed in V shapes. Another problem has been that permanent magnet cooling performance is reduced because the coolant that flows through the axial coolant flow channels does not contact the permanent magnets.

The present invention aims to solve the above problems and an object of the present invention is to provide a rotary electric machine that can increase permanent magnet cooling performance by using a construction in which a coolant contacts permanent magnets to cool the permanent magnets effectively.

Means for Solving the Problem

A rotary electric machine according to the present invention includes: a housing; a rotor including: a rotating shaft that is rotatably supported by the housing; a rotor core that is disposed inside the housing so as to be fixed to the rotating shaft; magnet accommodating apertures that are formed plurally in a circumferential direction so as to each pass axially through the rotor core; permanent magnets that are accommodated in each of the magnet accommodating apertures; coolant flow channels through which a coolant that cools each of the permanent magnets is made to flow; and a first end plate and a second end plate that are disposed on two axial ends of the rotor core to stop dislodging of the permanent magnets in an axial direction; and an annular stator that is held by the housing so as to surround the rotor. The rotary electric machine is configured such that: the coolant flow channels include: a main flow channel that is formed so as to be spaced apart from the magnet accommodating aperture on an inner circumferential side, and that forms a tubular flow channel that passes axially through the rotor core; a magnet cooling flow channel that is formed alongside the permanent magnet that is accommodated in the magnet accommodating aperture on an inner circumferential side of the permanent magnet, the magnet cooling flow channel passing axially through the rotor core, and an inner circumferential surface of the permanent magnet forming a portion of the magnet cooling flow channel; and a relay flow channel that passes axially through the rotor core in a state in which the main flow channel and the magnet cooling flow channel are linked; the first end plate is disposed on a first axial end of the rotor core, and opens a first axial end of the main flow channel, and closes a first axial end of the magnet cooling flow channel and the relay flow channel; the second end plate is disposed on a second axial end of the rotor core, and opens second axial ends of the main flow channel, the magnet cooling flow channel, and the relay flow channel; and the coolant that is supplied to the magnet cooling flow channel from the first axial end flows into the magnet cooling flow channel through the relay flow channel, and contacts the permanent magnets while flowing through the magnet cooling flow channel.

Effects of the Invention

According to the present invention, because the coolant contacts the inner circumferential surfaces of the permanent magnets while flowing through the magnet cooling flow channels, the permanent magnets can be cooled effectively, improving permanent magnet cooling performance.

DESCRIPTION OF EMBODIMENTS

Embodiment 1

Figure 1:
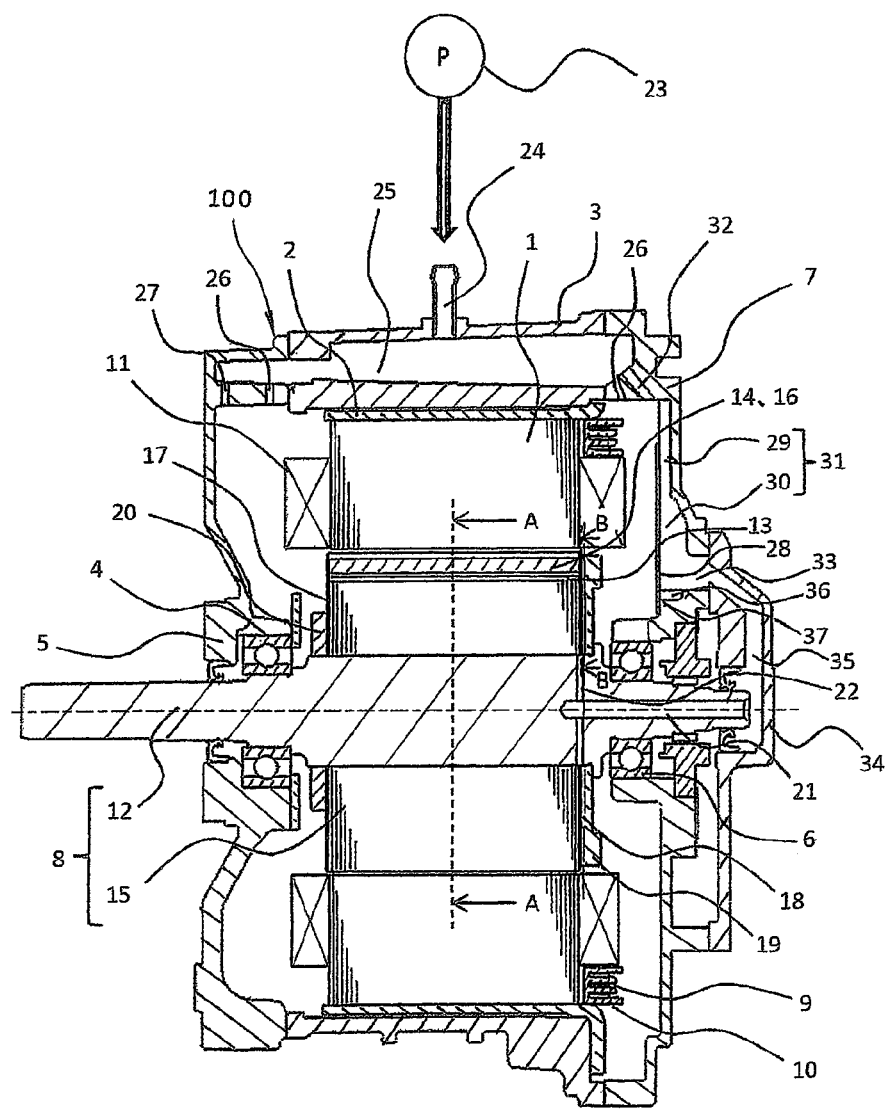
FIG. 1 is a longitudinal cross section that shows a rotary electric machine according to Embodiment 1 of the present invention.
Figure 2:
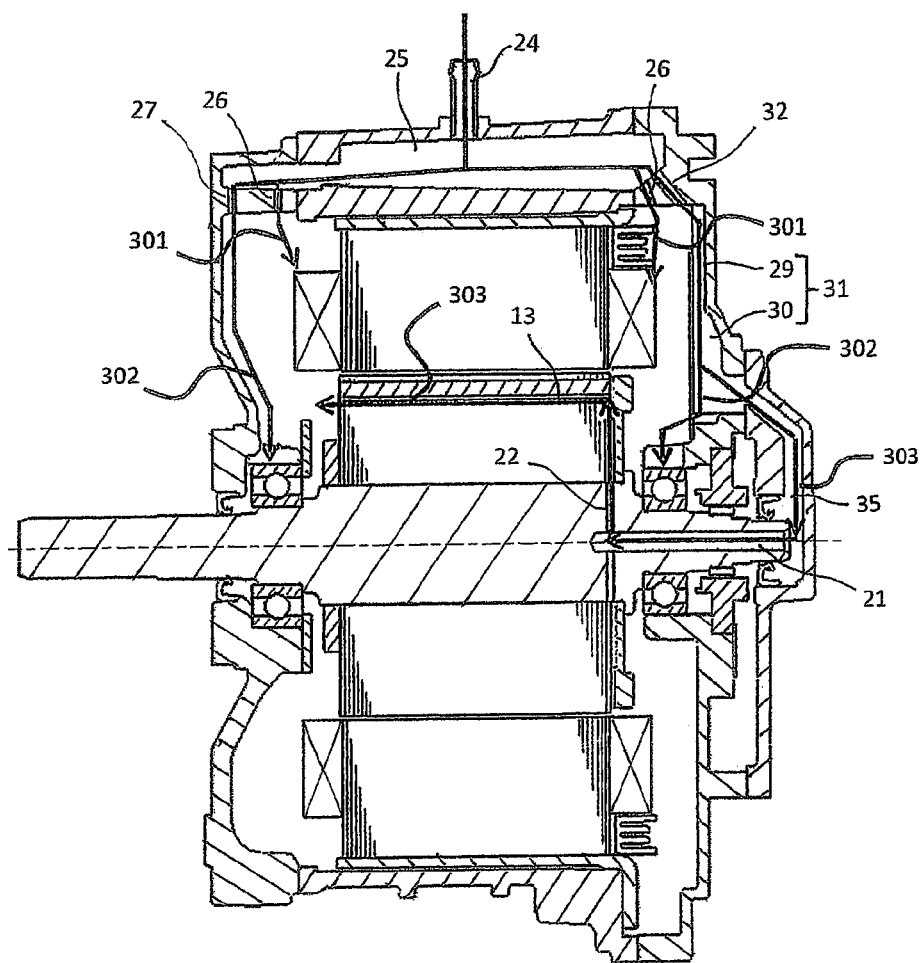
FIG. 2 is a longitudinal cross section that explains flow of coolant in the rotary electric machine according to Embodiment 1 of the present invention.
Figure 3:
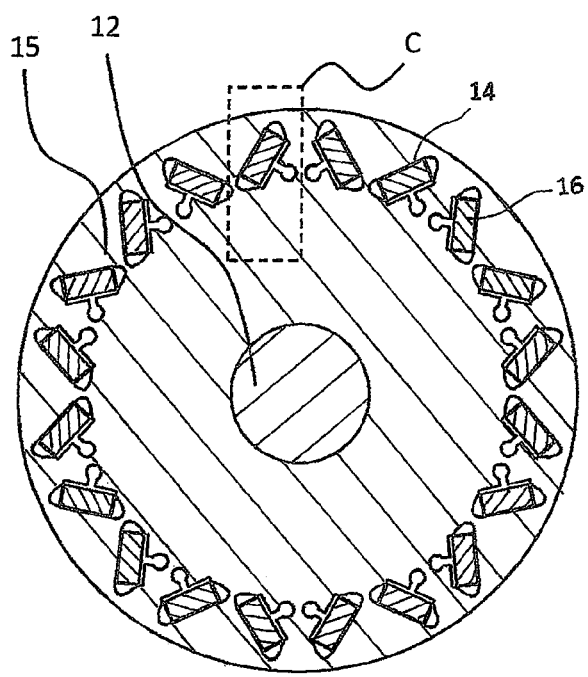
FIG. 3 is a cross section that is taken along A-A in FIG. 1 so as to be viewed in the direction of the arrows.
Figure 4:
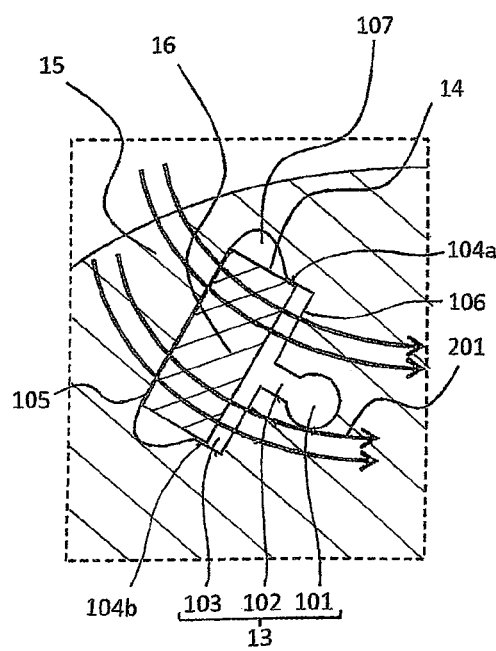
FIG. 4 is an enlargement of Portion C in FIG. 3.
Figure 5:
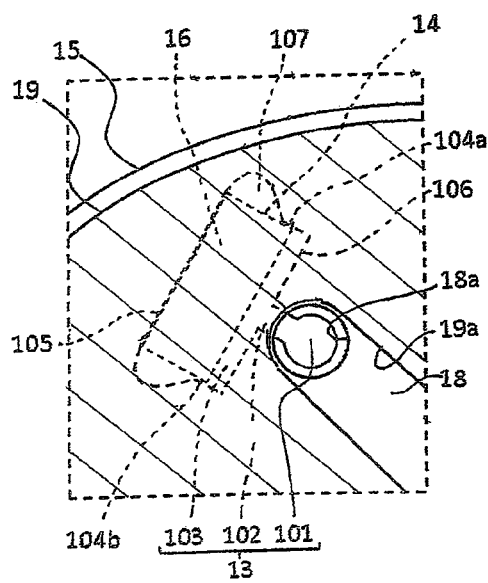
FIG. 5 is a cross section that is taken along B-B in FIG. 1 so as to be viewed in the direction of the arrows.
Figure 6:
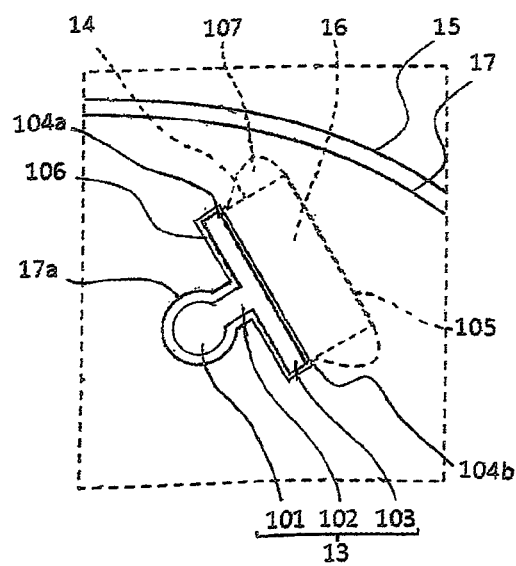
FIG. 6 is a partial plan that shows a vicinity of a magnet accommodating aperture of a rotor in the rotary electric machine according to Embodiment 1 of the present invention when viewed from a load end.

FIG. 1 is a longitudinal cross section that shows a rotary electric machine according to Embodiment 1 of the present invention, FIG. 2 is a longitudinal cross section that explains flow of coolant in the rotary electric machine according to Embodiment 1 of the present invention, FIG. 3 is a cross section that is taken along A-A in FIG. 1 so as to be viewed in the direction of the arrows, FIG. 4 is an enlargement of Portion C in FIG. 3, FIG. 5 is a cross section that is taken along B-B in FIG. 1 so as to be viewed in the direction of the arrows, and FIG. 6 is a partial plan that shows a vicinity of a magnet accommodating aperture of a rotor in the rotary electric machine according to Embodiment 1 of the present invention when viewed from a load end. Moreover, a "longitudinal cross section" is a cross section in a plane that includes a central axis of a rotating shaft. Furthermore, FIG. 2 is intended to explain coolant flow, and only some of the configuration is numbered.

In FIG. 1, a rotary electric machine includes: a housing 100; a rotor 8 that is rotatably disposed inside the housing 100; and an annular stator 1 that is held by the housing 100 so as to be disposed so as to surround the rotor 8 so as to be coaxial to the rotor 8. Here, the housing 100 is divided into three pieces: a center frame 3; a front frame 5; and a rear frame 7. Furthermore, a magnetic air gap portion is formed between the stator 1 and the rotor 8.

The stator 1 is configured by arranging into an annular shape core segments onto which coils are wound, for example, and is inserted into and fixed to a cylindrical frame 2 that is made of iron in an internally fitted state by press-fitting or shrink-fitting, etc. In addition, the stator 1, which is fixed to the frame 2, is fixed in an internally fitted state to the center frame 3, which is tubular and made of aluminum, by press-fitting or shrinkage fitting, etc. Busbars 9 for supplying electric power to respective phases of the coils are accommodated in a busbar holder 10, and are disposed on an end surface of the stator 1 at a non-load end. Moreover, portions of the coils that protrude from two axial end portions of the stator 1 constitute coil end portions 11.

The front frame 5 and the rear frame 7 are disposed so as to clamp the center frame 3 from two axial ends, and are integrated by fastening forces from fastening bolts (not shown). The stator 1 is thereby held by the front frame 5 and the rear frame 7. A rotating shaft 12 of the rotor 8 is supported by bearings 4 and 6 that are held by the front frame 5 and the rear frame 7.

The rotor 8 includes: a rotor core 15 that is configured by laminating electromagnetic steel sheets, and that is fixed to the rotating shaft 12, which passes through a central position thereof; permanent magnets 16 that are embedded so as to pass through the rotor core 15; a load-end end plate 17 that functions as a second end plate and a non-load-end end plate 18 that functions as a first end plate, that are disposed on two axial ends of the rotor core 15, and that prevent dislodging of the permanent magnets 16; a flow channel plate 19 that is disposed axially outside the non-load-end end plate 18; and a ring 20 that is disposed axially outside the load-end end plate 17, and that prevents dislodging of the rotor core 15.

As shown in FIG. 4, magnet accommodating apertures 14 are formed so as to pass axially through the rotor core 15, and such that cross-sectional shapes thereof that are perpendicular to the central axis of the rotating shaft 12 have a rectangular shape that includes a first outer circumferential magnet holding wall 104a, a first inner circumferential magnet holding wall 104b, a second outer circumferential magnet holding wall 105, and an inner circumferential long side 106. Pairs of magnet accommodating apertures 14 are disposed in V shapes in which long sides of the rectangular cross section of the magnet accommodating apertures 14 widen toward an outer circumferential side of the rotor core 15, and ten pairs are disposed at a uniform angular pitch in the circumferential direction around the outer circumferential side of the rotor core 15. In addition, penetrating apertures 13 that constitute coolant flow channels are formed so as to pass axially through the rotor core 15 on an inner circumferential side of each of the magnet accommodating apertures 14.

The permanent magnets 16 are produced so as to have rod-shaped bodies that have a rectangular cross section, are positioned by contacting the first outer circumferential magnet holding wall 104a and the inner circumferential magnet holding wall 104b, which are constituted by short sides of the rectangular cross section of each magnet accommodating aperture 14, and the second outer circumferential magnet holding wall 105, which is constituted by a long side of the rectangular cross section of each magnet accommodating aperture 14, and are fixed to the second outer circumferential magnet holding wall 105 using adhesive. Thus, pairs of permanent magnets 16 that are disposed in V shapes that widen toward an outer circumferential side are arranged at a uniform angular pitch circumferentially. Each of the permanent magnets 16 is magnetically oriented such that outer circumferential polarities of the pairs of permanent magnets 16 that are arranged circumferentially alternately form North-seeking (N) poles and South-seeking (S) poles circumferentially.

Air gap portions 107 are formed by expanding the first outer circumferential magnet holding wall 104a and the inner circumferential magnet holding wall 104b of the magnet accommodating aperture 14 outward in the long-side longitudinal direction of the rectangular cross section of the magnet accommodating aperture 14 in a vicinity of the second outer circumferential magnet holding wall 105 of each.

Main flow channels 101 have a cross-sectional shape perpendicular to the central axis of the rotating shaft 12 that is circular, and are formed so as to pass axially through the rotor core 15 so as to be spaced apart from the magnet accommodating apertures 14 on inner circumferential sides of the magnet accommodating apertures 14. A long-side length of the rectangular cross section of the magnet accommodating apertures 14 is equal to or slightly longer than a long-side length of the rectangular cross section of the permanent magnets 16, and a short-side length of the rectangular cross section thereof is longer than a short-side length of the rectangular cross section of the permanent magnets 16. Thus, the permanent magnets 16 that are fixed to the second outer circumferential magnet holding walls 105 are accommodated so as to be biased toward an outer circumferential side inside the magnet accommodating apertures 14, and magnet cooling flow channels 103 are formed in the magnet accommodating apertures 14 on inner circumferential sides of the permanent magnets 16. Surfaces of the permanent magnets 16 that face an inner circumferential side constitute portions of the magnet cooling flow channels 103. In addition, relay flow channels 102 are formed so as to pass axially through the rotor core 15 so as to link the main flow channels 101 and the magnet cooling flow channels 103. Widths of the relay flow channels 102 are narrower than diameters of the main flow channels 101. In other words, cross-sectional areas of the main flow channels 101 are greater than cross-sectional areas of the relay flow channels 102. Moreover, the width of the relay flow channels 102 is a length of the relay flow channels 102 in the long-side longitudinal direction of the rectangular cross section of the magnet accommodating apertures 14.

The penetrating apertures 13 are constituted by the main flow channels 101, the relay flow channels 102, and the magnet cooling flow channels 103, and are formed so as to pass axially through the rotor core 15 so as to have a constant cross-sectional shape. The penetrating apertures 13 and the magnet accommodating apertures 14 are formed as single apertures, and the magnet cooling flow channels 103 and the air gap portions 107 are formed by accommodating the permanent magnets 16 in the magnet accommodating apertures 14. Here, the main flow channels 101 are tubular flow channels that extend axially. The magnet cooling flow channels 103 pass through the rotor core 15 axially alongside the permanent magnets 16 on inner circumferential sides of the permanent magnets 16. The relay flow channels 102 link the main flow channels 101 and the magnet cooling flow channels 103. A circumferential width of these relay flow channels 102 is narrower than a circumferential width of the main flow channels 101 and the magnet cooling flow channels 103, such that there is a constriction between the main flow channels 101 and the magnet cooling flow channels 103. The area of the rotor core 15 through which the magnetic flux 201 passes is enlarged by this constriction when the magnetic flux 201 that is shown in FIG. 4 flows through the rotor core 15 from the permanent magnets 16.

As shown in FIG. 6, the load-end end plate 17 is produced into a ring-shaped flat plate that has an outside diameter that is less than an outside diameter of the rotor core 15, and covers load-end end portions of the permanent magnets 16. In addition, penetrating apertures 17a are formed on the load-end end plate 17 so as to open load-end end portions of the main flow channels 101, the relay flow channels 102, and the magnet cooling flow channels 103. Moreover, the load-end end portions of the main flow channels 101, the relay flow channels 102, and the magnet cooling flow channels 103 are fully open, but it is sufficient if at least a portion of the load-end end portion of each of the main flow channels 101, the relay flow channels 102, and the magnet cooling flow channels 103 are open.

As shown in FIG. 5, the non-load-end end plate 18 is produced into a ring-shaped flat plate that has an outside diameter that is less than an outside diameter of the rotor core 15, and covers non-load-end end portions of the permanent magnets 16. In addition, penetrating apertures 18a are formed on the non-load-end end plate 18 so as to open non-load-end end portions of the main flow channels 101, and at least a portion of the non-load-end end portions of the relay flow channels 102 are open. Moreover, non-load-end end portions of the magnet cooling flow channels 103 are closed by the non-load-end end plate 18.

As shown in FIG. 5, the flow channel plate 19 is produced into a ring-shaped flat plate that has an outside diameter that is less than an outside diameter of the rotor core 15, and is disposed so as to contact the non-load-end end plate 18. Communicating channels 19a are recessed into a surface of the flow channel plate 19 in a radial pattern on a side near the non-load-end end plate 18, and outer circumferential end portions of the communicating channels 19a overlap axially with each of the penetrating apertures 18a.

A first shaft flow channel 21 is formed at central axial position of the rotating shaft 12 so as to extend from a non-load-end end portion until radially inside a non-load-end end portion of the rotor core 15. In addition, second shaft flow channels 22 are formed on the rotating shaft 12 so as to extend radially outward from a load-end end portion of the first shaft flow channel 21, and communicate between the first shaft flow channel 21 and each of the communicating channels 19a.

An inlet 24 that introduces cooling oil that functions as a coolant that has been conveyed under pressure from an external pump 23, and a first flow channel 25 that passes axially through the center frame 3, for allowing the cooling oil that is introduced through the inlet 24 to flow to the front frame 5 and the rear frame 7, are formed on the center frame 3.

A coil nozzle 26 that sprays the cooling oil that has flowed in through the first flow channel 25 toward the coil end portions 11, and a bearing nozzle 27 that sprays toward the bearing 4, are formed on the front frame 5. A coil nozzle 26 that sprays the cooling oil that has flowed in through the first flow channel 25 onto the coil end portions 11, and a shaft nozzle 32 that sprays toward a coolant inlet portion 29 (described below), are formed on the rear frame 7.

A cover 28 is disposed axially inside the rear frame 7. In addition, a rear cover 34 is disposed axially outside the rear frame 7 so as to cover an end portion of the rotating shaft 12 that protrudes outward from the rear frame 7. A second flow channel 31 that is constituted by the coolant inlet portion 29 and a coolant storage portion 30 is formed between the rear frame 7 and the cover 28. A third flow channel 35 is also formed on the rear cover 34 so as to face the first shaft flow channel 21. A penetrating aperture 33 is formed on the rear frame 7 and communicates between the coolant storage portion 30 and the third flow channel 35.

A stepped portion 36 is formed on a portion of the rear frame 7 that constitutes a lower end surface of the coolant storage portion 30 so as to lower a load end. In addition, a small aperture 37 is formed on the cover 28 so as to communicate between the stepped portion 36 and a side near the rotor core 15.

A cooling method for the permanent magnets 16 in the rotary electric machine that is configured in this manner will be explained with reference to FIG. 2. Moreover, arrows in FIG. 2 represent cooling oil flow.

The cooling oil is conveyed under pressure by an external pump 23 to the first flow channel 25 through the inlet 24 and flows into the front frame 5 and the rear frame 7. The cooling oil that has flowed into the front frame 5 is sprayed toward the coil end portions 11 from the coil nozzle 26, and is sprayed toward the bearing 4 from the bearing nozzle 27. The front-end coil end portions 11 and the bearing 4 are thereby cooled. The cooling oil that has flowed into the rear frame 7 is sprayed toward the coil end portions 11 from the coil nozzle 26. The rear-end coil end portions 11 are thereby cooled. In addition, the cooling oil that has flowed into the rear frame 7 is sprayed toward the coolant inlet portion 29 from the shaft nozzle 32. The cooling oil thereby passes through the coolant inlet portion 29 and is stored in the coolant storage portion 30. The cooling oil that is stored in the coolant storage portion 30 passes from the stepped portion 36 through the small aperture 37 and is poured onto the bearing 6. The rear-end bearing 6 is thereby cooled.

The cooling oil that is stored in the coolant storage portion 30 also passes through the penetrating aperture 33 and flows into the third flow channel 35. The cooling oil that has flowed into the third flow channel 35 passes from the first shaft flow channel 21 through the second shaft flow channels 22 and the communicating channels 19a, and flows through the penetrating apertures 18a into the main flow channels 101. The cooling oil that has flowed into the main flow channels 101 flows axially through the main flow channels 101 while absorbing heat from the rotor core 15, and flows out through the penetrating apertures 17a at the load end. A portion of the cooling oil that flows through the main flow channels 101 flows through the relay flow channels 102 into the magnet cooling flow channels 103 due to centrifugal forces, absorbs heat from the permanent magnets 16 while flowing axially through the magnet cooling flow channels 103, and flows out through the penetrating apertures 17a at the load end.

According to Embodiment 1, because cooling oil that cools the permanent magnets 16 flows axially through the rotor core 15 and does not flow out into a magnetic air gap portion between the stator 1 and the rotor 8, the generation of frictional heat due to the presence of cooling oil in the magnetic air gap portion is suppressed, suppressing decreases in cooling performance of the permanent magnets 16.

Because the magnet cooling flow channels 103 are formed so as to cool each of the permanent magnets 16, cooling performance of the permanent magnets 16 can be improved. In addition, because the cooling oil contacts the permanent magnets 16 while flowing through the magnet cooling flow channels 103, cooling performance of the permanent magnets 16 can be further improved.

Main flow channels 101 are included that pass axially through the rotor core 15 on inner circumferential sides of the magnet cooling flow channels 103, and cooling oil that has not been warmed flows through the main flow channels 101 without contributing to the cooling of the permanent magnets 16. Because the diameter of the main flow channels 101 is greater than the width of the relay flow channels 102, the cross-sectional area of the main flow channels 101 can be enlarged, enabling the amount of flow of the cooling oil to be increased. Thus, the rotor core 15, which constitutes a heat source, can be cooled effectively. Moreover, because the cooling oil that flows through the main flow channels 101 passes through the relay flow channels 102 due to centrifugal force due to the rotation of the rotor 8 and is supplied to the magnet cooling flow channels 103, there is no problem with making the width of the relay flow channels 102 narrower.

Now, as indicated by the arrows in FIG. 4, the magnetic flux 201 from the permanent magnets 16 emerges from a surface on an inner circumferential side that is constituted by a long side of the rectangular cross section, and flows through the stator core to return to a surface on an outer circumferential side that is constituted by a long side of the rectangular cross section of the permanent magnets 16. In other words, the magnetic flux density is highest in the magnet cooling flow channels 103. Because air gap portions 107 are formed by expanding the first outer circumferential magnet holding wall 104a and the inner circumferential magnet holding wall 104b of the magnet accommodating aperture 14 outward in the longitudinal direction of the rectangular cross section of the magnet accommodating aperture 14 in a vicinity of the second outer circumferential magnet holding wall 105 of each, magnetic resistance is increased in a magnetic path in which magnetic flux that has flowed out from the surface of the permanent magnets 16 on the inner circumferential side that is constituted by the long side of the rectangular cross section passes outside the air gap portions 107, and returns to the outer circumferential surface of the permanent magnets 16 that is constituted by the long side of the rectangular cross section, suppressing the generation of magnetic leakage flux.

Because the radial thickness of the magnet cooling flow channels 103 is smaller than a short side of the rectangular cross section of the permanent magnets 16, and the width of the relay flow channels 102 is smaller than the diameter of the main flow channels 101, the flow of magnetic flux from the inner circumferential surfaces of the permanent magnets 16 that are constituted by the long side of the rectangular cross section through the magnet cooling flow channels 103 toward the rotor core 15 is not obstructed.

Figure 7A:
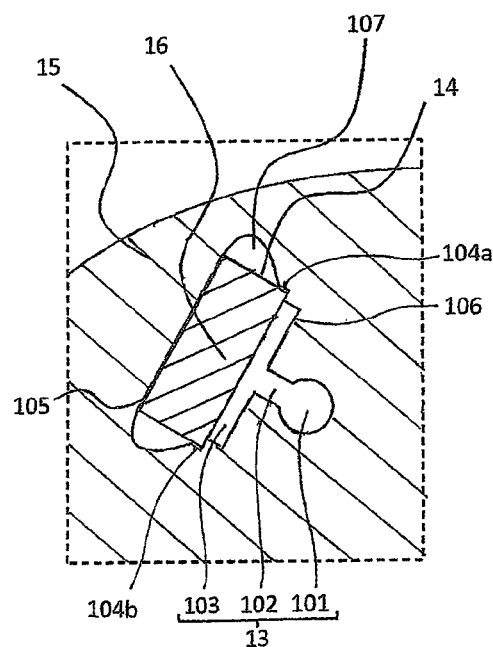
FIG. 7A is a partial cross section that shows a first variation of a magnet cooling flow channel in the rotary electric machine according to Embodiment 1 of the present invention.
Figure 7B:
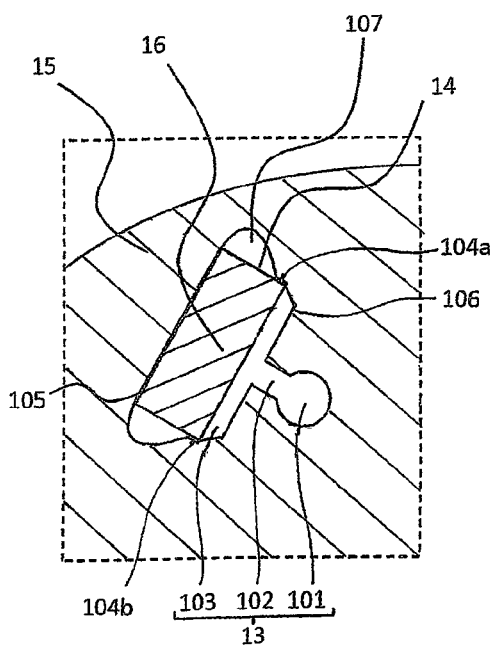
FIG. 7B is a partial cross section that shows a second variation of a magnet cooling flow channel in the rotary electric machine according to Embodiment 1 of the present invention.

Now, in Embodiment 1 above, the magnet cooling flow channels 103 are formed so as to have an aperture shape that has a rectangular cross section that has a long side that has a length that is equal to that of a long side of the rectangular cross section of the permanent magnets 16, but the cross-sectional shape of the magnet cooling flow channels 103 is not limited to a rectangular shape. As shown in FIG. 7A, for example, the magnet cooling flow channels 103 may be formed so as to have an aperture shape that has a rectangular cross section that has a long side that has a length that is shorter than that of a long side of the rectangular cross section of the permanent magnets 16. As shown in FIG. 7B, the magnet cooling flow channels 103 may be given an aperture shape that has an isosceles trapezoidal cross section that has a lower base that has a length that is equal to that of the long side of the rectangular cross section of the permanent magnets 16, and an upper base that has a length that is shorter than that of the long side of the rectangular cross section of the permanent magnets 16.

Embodiment 2

Figure 8:
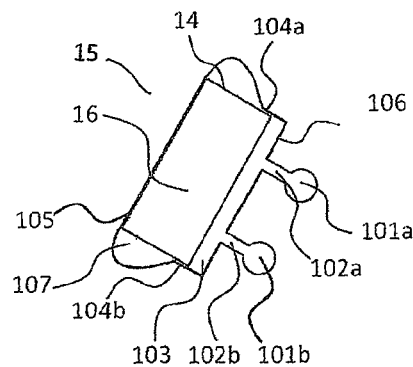
FIG. 8 is a partial plan that shows a vicinity of a magnet accommodating aperture of a rotor in a rotary electric machine according to Embodiment 2 of the present invention when viewed from a non-load end.

FIG. 8 is a partial plan that shows a vicinity of a magnet accommodating aperture of a rotor in a rotary electric machine according to Embodiment 2 of the present invention when viewed from a non-load end.

In FIG. 8, a first main flow channel 101a and a second main flow channel 101b are formed on a radially inner side of a magnet cooling flow channel 103 so as to pass axially through a rotor core 15 so as to have aperture shapes that have circular cross sections of identical diameter, and so as to be spaced apart in a long-side longitudinal direction of a rectangular cross section of a magnet accommodating aperture 14. A first relay flow channel 102a and a second relay flow channel 102b are formed so as to pass axially through the rotor core so as to have identical widths and identical cross-sectional areas so as to link the first main flow channel 101a and the magnet cooling flow channel 103, or link the second main flow channel 101b and the magnet cooling flow channel 103, respectively. In this configuration also, penetrating apertures 18a are formed on a non-load-end end plate in a similar manner to the construction that is shown in FIG. 5, so as to open non-load-end end portions of the first main flow channel 101a and the second main flow channel 101b, and open at least a portion of non-load-end end portions of the first relay flow channel 102a and the second relay flow channel 102b. In a similar or identical manner to the construction that is shown in FIG. 5, communicating channels 19a are formed on a flow channel plate such that outer circumferential end portions thereof overlap axially with penetrating apertures that are formed on the non-load-end end plate. In addition, load-end end portions of the first main flow channel 101a, the second main flow channel 101b, the first relay flow channel 102a, the second relay flow channel 102b, and the magnet cooling flow channels 103 are open, in a similar or identical manner to the construction that is shown in FIG. 6.

Moreover, a remainder of the configuration of Embodiment 2 is configured in a similar or identical manner to that of Embodiment 1 above.

In Embodiment 2, cooling oil that cools the permanent magnets 16 flows axially through the rotor core 15, and does not flow out into the magnetic air gap portion between the stator 1 and the rotor 8. Magnet cooling flow channels 103 are also formed so as to cool each of the permanent magnets 16. The cooling oil also contacts the permanent magnets 16 while flowing through the magnet cooling flow channels 103. Consequently, similar or identical effects to those of Embodiment 1 above can also be achieved in Embodiment 2.

If, for example, the cooling oil is supplied to the magnet cooling flow channels 103 from a central portion in a long-side longitudinal direction of the rectangular cross section, eddies in the cooling oil are more likely to arise at two longitudinal end portions of the long sides of the rectangular cross section of the magnet cooling flow channels 103. If eddies arise in the cooling oil inside the magnet cooling flow channels 103, the cooling performance of the permanent magnets 16 will decrease.

According to Embodiment 2, because a first main flow channel 101a and a second main flow channel 101b are disposed so as to be spaced apart in a long-side longitudinal direction of a rectangular cross section of a magnet accommodating aperture 14, cooling oil is supplied to the magnet cooling flow channels 103 from two positions that are spaced apart in the long-side longitudinal direction of the rectangular cross section of the magnet accommodating apertures 14. The cooling oil thereby flows through the magnet cooling flow channels 103 without eddies, enabling the cooling performance of the permanent magnets 16 to be improved.

Moreover, in Embodiment 2 above, two main flow channels are formed so as to be spaced apart in the long-side longitudinal direction of the rectangular cross section of the magnet accommodating aperture, but the number of main flow channels may be three or more.

Embodiment 3

Figure 9:
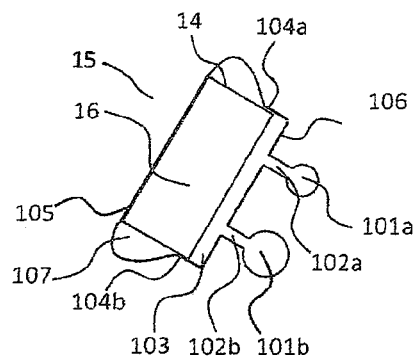
FIG. 9 is a partial plan that shows a vicinity of a magnet accommodating aperture of a rotor in a rotary electric machine according to Embodiment 3 of the present invention when viewed from a non-load end.
Figure 10:
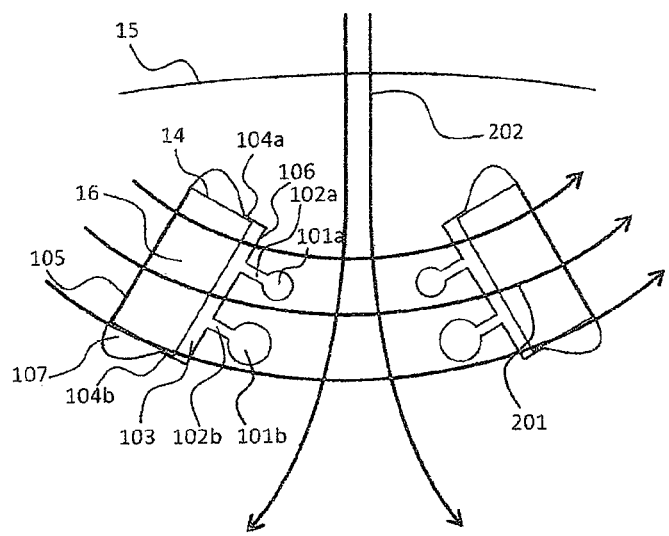
FIG. 10 is a partial plan that explains flow of magnetic flux in the vicinity of the magnet accommodating aperture of the rotor in the rotary electric machine according to Embodiment 3 of the present invention.

FIG. 9 is a partial plan that shows a vicinity of a magnet accommodating aperture of a rotor in a rotary electric machine according to Embodiment 3 of the present invention when viewed from a non-load end, and FIG. 10 is a partial plan that explains flow of magnetic flux in the vicinity of the magnet accommodating aperture of the rotor in the rotary electric machine according to Embodiment 3 of the present invention.

In FIG. 9, of a first main flow channel 101a and a second main flow channel 101b, cross-sectional area of the second main flow channel 101b, which is disposed on an inner circumferential side, is greater than cross-sectional area of the first main flow channel 101a, which is disposed on an outer circumferential side. In addition, a width of a second relay flow channel 102b that links the second main flow channel 101b and a magnet cooling flow channel 103 is wider than a width of a first relay flow channel 102a that links the first main flow channel 101a and the magnet cooling flow channel 103. In other words, cross-sectional area of the second relay flow channel 102b is greater than cross-sectional area of the first relay flow channel 102a.

Moreover, a remainder of the configuration of Embodiment 3 is configured in a similar or identical manner to that of Embodiment 2 above.

Consequently, similar effects to those in Embodiment 2 above can also be achieved in Embodiment 3.

Now, because the centrifugal force that acts on the cooling oil that flows through the inner circumferential second main flow channel 101b is less than the centrifugal force that acts on the cooling oil that flows through the radially outer first main flow channel 101a, cooling oil is less likely to be supplied to the magnet cooling flow channel 103 by means of the second relay flow channel 102b through the inner circumferential second main flow channel 101b. According to Embodiment 3, because the cross-sectional area of the inner circumferential second main flow channel 101b is made greater than the cross-sectional area of the outer circumferential first main flow channel 101a, the flow rate of the cooling oil that flows through the second main flow channel 101b is increased, increasing the supply of the coolant oil from the second main flow channel 101b to the magnet cooling flow channel 103, thereby enabling the cooling performance of the permanent magnets 16 to be improved.

In addition, because the cross-sectional area of the radially outer first main flow channel 101a can be reduced without reducing the cooling performance of the permanent magnets 16, the magnetic path cross-sectional area between the pairs of permanent magnets 16, which is a pathway of the magnetic flux 202 that is generated by the coils of the stator, is increased, as shown in FIG. 10, preventing the flow of the magnetic flux 202 from being obstructed.

Moreover, in Embodiment 3 above, two main flow channels are formed so as to be spaced apart in the long-side longitudinal direction of the rectangular cross section of the magnet accommodating aperture, but the number of main flow channels may be three or more.

Embodiment 4

Figure 11:
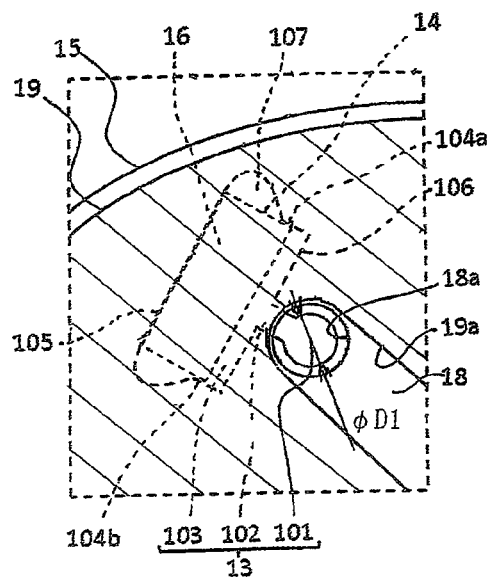
FIG. 11 is a partial cross section that shows a vicinity of a main flow channel of a flow channel plate in a rotary electric machine according to Embodiment 4 of the present invention.
Figure 12:
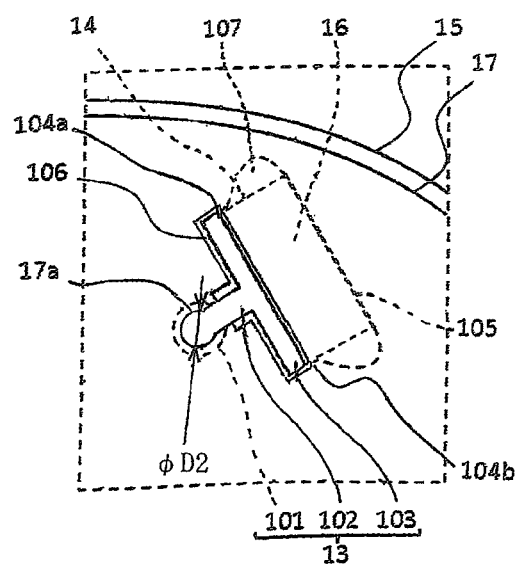
FIG. 12 is a partial plan that shows a vicinity of a magnet accommodating aperture of a rotor in the rotary electric machine according to Embodiment 4 of the present invention when viewed from a load end.

FIG. 11 is a partial cross section that shows a vicinity of a main flow channel of a flow channel plate in a rotary electric machine according to Embodiment 4 of the present invention, and FIG. 12 is a partial plan that shows a vicinity of a magnet accommodating aperture of a rotor in the rotary electric machine according to Embodiment 4 of the present invention when viewed from a load end.

In FIGS. 11 and 12, an aperture diameter D2 of a portion of a penetrating aperture 17a of a load-end end plate 17 that faces an outlet of a main flow channel 101 is smaller than an aperture diameter D1 of the main flow channel 101.

Moreover, a remainder of the configuration of Embodiment 4 is configured in a similar or identical manner to that of Embodiment 1 above.

Consequently, similar or identical effects to those in Embodiment 1 above can also be achieved in Embodiment 4.

According to Embodiment 4, the aperture area of the flow channel port in the main flow channel 101 when the load-end end plate 17 is viewed from a load end is smaller than the flow channel port aperture area in the main flow channel 101 when the non-load-end end plate 18 is viewed from the non-load end. In other words, the outlet of the main flow channel 101 is constricted from the diameter D1 to the diameter D2 by the load-end end plate 17. Thus, because pressure loss inside the main flow channel 101 is increased, the cooling oil that is supplied to the main flow channels 101 is made to flow through the relay flow channels 102 to the magnet cooling flow channels 103 effectively, improving the cooling performance of the permanent magnets 16.

Moreover, in Embodiment 4 above, the aperture areas of the main flow channels are reduced when the load-end end plate is viewed from the load end by reducing the penetrating apertures of the load-end end plate so as to partially cover the main flow channels, but the aperture areas of the main flow channels may be reduced by reducing the diameter of the openings that constitute part of the main flow channels only on a electromagnetic steel sheet that constitutes a load-end end portions of the rotor core without reducing the penetrating apertures of the load-end end plate.

Variations in the main flow channel 101 and the relay flow channel 102 will now be explained with reference to FIGS. 13A through 13H. FIGS. 13A through 13H are respective partial plans that show variations of a coolant flow channel that is formed on a rotor core in the rotary electric machine according to the present invention.

Figure 13A:
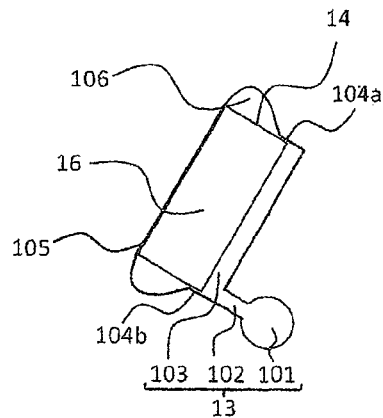
FIG. 13A is a partial plan that shows a first variation of a coolant flow channel that is formed on a rotor core in the rotary electric machine according to the present invention.

In Embodiment 1 above, the main flow channel 101 and the relay flow channel 102 are disposed on a longitudinally central portion of the rectangular cross section of the magnet accommodating aperture 14, but the main flow channel 101 and the relay flow channel 102 may be disposed so as to be close to a first longitudinal end (an inner circumferential end) of the rectangular cross section of the magnet accommodating aperture 14, as shown in FIG. 13A, or may be disposed so as to be close to a second longitudinal end (an outer circumferential end) of the rectangular cross section of the magnet accommodating aperture 14.

Figure 13B:
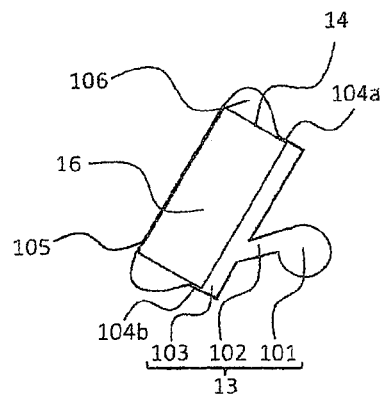
FIG. 13B is a partial plan that shows a second variation of a coolant flow channel that is formed on a rotor core in the rotary electric machine according to the present invention.

In Embodiment 1 above, the relay flow channel 102 is linked to the magnet cooling flow channel 103 so as to be perpendicular to a longitudinal directions of the rectangular cross section of the magnet accommodating aperture 14, but as shown in FIG. 13B, the relay flow channel 102 may be linked to the magnet cooling flow channel 103 so as to be inclined relative to the longitudinal direction of the rectangular cross section of the magnet accommodating aperture 14. In FIG. 13B, the relay flow channel 102 is linked to the magnet cooling flow channel 103 so as to be inclined relative to the longitudinal direction of the rectangular cross section of the magnet accommodating aperture 14 such that an outer circumferential side forms an acute angle, but the relay flow channel 102 may be linked to the magnet cooling flow channel 103 so as to be inclined relative to the longitudinal direction of the rectangular cross section of the magnet accommodating aperture 14 such that an inner circumferential side forms an acute angle.

Figure 13C:
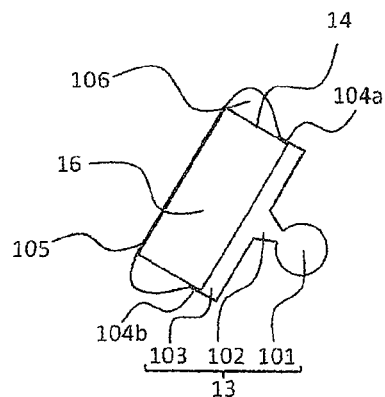
FIG. 13C is a partial plan that shows a third variation of a coolant flow channel that is formed on a rotor core in the rotary electric machine according to the present invention.

In Embodiment 1 above, a cross-sectional shape of the relay flow channel 102 perpendicular to the axial direction is rectangular, but as shown in FIG. 13C, a cross-sectional shape of the relay flow channel 102 perpendicular to the axial direction may be an isosceles trapezoid that has a linking portion with the main flow channels 101 as an upper base, and that has a linking portion with the magnet cooling flow channel 103 as a lower base.

Figure 13D:
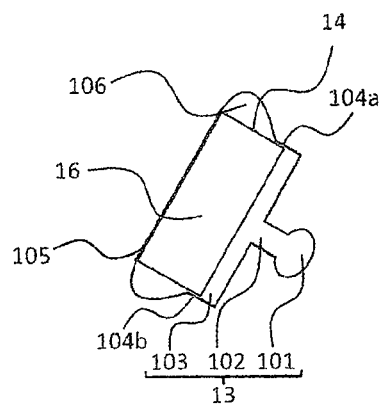
FIG. 13D is a partial plan that shows a fourth variation of a coolant flow channel that is formed on a rotor core in the rotary electric machine according to the present invention.
Figure 13E:
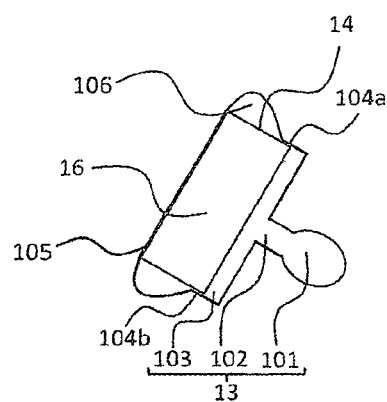
FIG. 13E is a partial plan that shows a fifth variation of a coolant flow channel that is formed on a rotor core in the rotary electric machine according to the present invention.
Figure 13F:
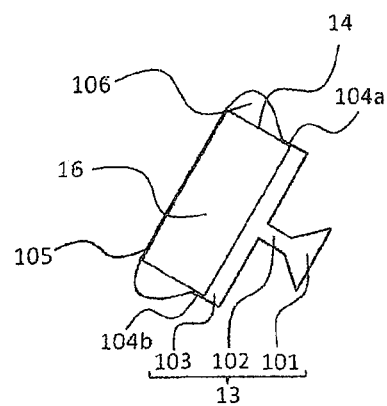
FIG. 13F is a partial plan that shows a sixth variation of a coolant flow channel that is formed on a rotor core in the rotary electric machine according to the present invention.
Figure 13G:
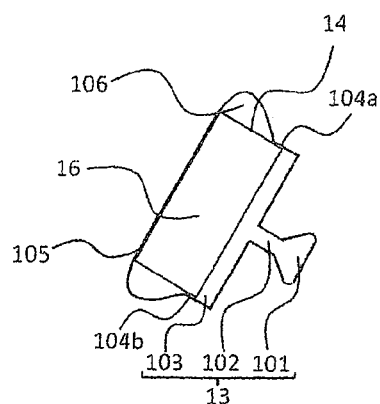
FIG. 13G is a partial plan that shows a seventh variation of a coolant flow channel that is formed on a rotor core in the rotary electric machine according to the present invention.
Figure 13H:
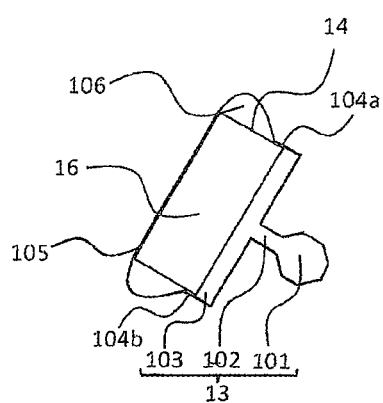
FIG. 13H is a partial plan that shows an eighth variation of a coolant flow channel that is formed on a rotor core in the rotary electric machine according to the present invention.

In Embodiment 1 above, the cross-sectional shape of the main flow channel 101 perpendicular to the axial direction is circular, but the cross-sectional shape of the main flow channel 101 perpendicular to the axial direction is not limited to a circular shape. The cross-sectional shape of the main flow channel 101 perpendicular to the axial direction may be elliptical, as shown in FIGS. 13D and 13E, for example, or may be triangular, as shown in FIG. 13F, or may be triangular with rounded corner portions, as shown in FIG. 13G, or may be a regular octagon, as shown in FIG. 13H.

The main flow channel 101 is formed so as to have a cross-sectional shape that is symmetrical relative to a line segment that passes through a center of the main flow channel 101 and that is perpendicular to the long sides of the rectangular cross section of the magnet accommodating aperture 14, but the main flow channel 101 may have a cross-sectional shape that is asymmetrical relative to the line segment that passes through the center of the main flow channel 101 and that is perpendicular to the long sides of the rectangular cross section of the magnet accommodating aperture 14.

In this manner, the main flow channel 101 and the relay flow channel 102 can adopt various cross-sectional shapes and arrangements provided that the cooling oil that flows through the main flow channel 101 can be supplied to the magnet cooling flow channel 103 through the relay flow channel 102.

Even if a plurality of main flow channels 101 and relay flow channels 102 are disposed on one magnet cooling flow channel 103, the plurality of main flow channels 101 and the plurality of relay flow channels 102 can adopt various cross-sectional shapes and arrangements provided that the cooling oil that flows through the main flow channels 101 can be supplied to the magnet cooling flow channel 103 through the relay flow channels 102. Furthermore, the cross-sectional shapes of the plurality of main flow channels 101 and the plurality of relay flow channels 102 may be mutually different.

Moreover, in each of the above embodiments, the cooling oil is sprayed directly onto the coil end portions from the coil nozzles, but positions and shapes of the coil nozzles may be changed such that the cooling oil cannot be sprayed onto the coil end portions directly, and the cooling oil may instead be led to the coil end portions by means of separate members.

In each of the above embodiments, the cooling oil is sprayed directly onto the bearings from the bearing nozzles, but positions and shapes of the bearing nozzles may be changed such that the cooling oil cannot be sprayed onto the bearings directly, and the cooling oil may instead be led to the bearings by means of separate members.

In each of the above embodiments, coil nozzles, bearing nozzles, and shaft nozzles are formed singly on the front frame and the rear frame, but coil nozzles, bearing nozzles, and shaft nozzles may be formed plurally on the front frame and the rear frame.

In each of the above embodiments, a housing is divided into three pieces, i.e., a front frame, a center frame, and a rear frame, but the housing may be configured so as to be divided into two pieces by producing a center frame so as to be integrated with a front frame or a rear frame, while leaving a remaining one separate.

In each of the above embodiments, pairs of permanent magnets that are disposed in V shapes that widen toward an outer circumferential side are disposed at a uniform angular pitch circumferentially, but permanent magnets may be disposed singly at a uniform angular pitch circumferentially. In that case, the main flow channels, the relay flow channels, and the magnet cooling flow channels should be disposed circumferentially inside the permanent magnets and the cooling oil should contact the permanent magnets as it flows through the magnet cooling flow channels.

In each of the above embodiments, the permanent magnets are produced so as to have rectangular cross-sections, but the cross-sectional shapes of the permanent magnets are not limited to rectangular shapes, and may be circular arc shapes, for example.

Moreover, in each of the above embodiments, cooling oil that is conveyed under pressure by a pump is supplied to the main flow channels through the first shaft flow channel, the second shaft flow channels, and the communicating channels of the flow channel plate, but it goes without saying that the method for supplying the cooling oil to the main flow channels is not limited thereto.

If the rotary electric machine according to the present invention is used in vehicles, cooling performance is high because internal parts of the rotary electric machine such as the permanent magnets can be cooled directly, enabling the rotary electric machine to be reduced in size and weight. Due to reductions in size of the rotary electric machine, constraints on installation in the vehicle can be reduced, and due to reductions in weight of the rotary electric machine, energy efficiency of the vehicle, i.e., electric power consumption or fuel consumption, etc., can be improved. If the rotary electric machine according to the present invention is used in industrial machinery, output can be improved without increasing the external shape of the housing. In transportation equipment, for example, the weight of the transported objects can thereby be increased. In machining tools, time that is spent moving workpieces can be shortened.

The invention claimed is:

1. A rotary electric machine comprising:
   a housing;
   a rotor comprising:
   a rotating shaft that is rotatably supported by said housing;
   a rotor core that is disposed inside said housing so as to be fixed to said rotating shaft;
   magnet accommodating apertures that are formed plurally in a circumferential direction so as to each pass axially through said rotor core;
   permanent magnets that are accommodated in each of said magnet accommodating apertures;
   coolant flow channels through which a coolant that cools each of said permanent magnets is made to flow; and
   a first end plate and a second end plate that are disposed on two axial ends of said rotor core to stop dislodging of said permanent magnets in an axial direction; and
   an annular stator that is held by said housing so as to surround said rotor,
   wherein said rotary electric machine is configured such that:
   said coolant flow channels each comprise:
   a main flow channel that is formed so as to be spaced apart from said magnet accommodating aperture on an inner circumferential side, and that forms a tubular flow channel that passes axially through said rotor core;
   a magnet cooling flow channel that is formed alongside said permanent magnet that is accommodated in said magnet accommodating aperture on an inner circumferential side of said permanent magnet, said magnet cooling flow channel passing axially through said rotor core, and an inner circumferential surface of said permanent magnet forming a portion of said magnet cooling flow channel; and
   a relay flow channel that passes axially through said rotor core in a state in which said main flow channel and said magnet cooling flow channel are linked;
   said first end plate is disposed on a first axial end of said rotor core, and opens a first axial end of said main flow channel, and closes a first axial end of said magnet cooling flow channel and said relay flow channel;
   said second end plate is disposed on a second axial end of said rotor core, and opens second axial ends of said main flow channel, said magnet cooling flow channel, and said relay flow channel; and
   said coolant that is supplied to said main flow channel from said first axial end flows into said magnet cooling flow channel through said relay flow channel, and contacts said permanent magnets while flowing through said magnet cooling flow channel.

2. The rotary electric machine according to claim 1, wherein a circumferential width of said relay flow channel is smaller than said main flow channel and said magnet cooling flow channel so as to be constricted between said main flow channel and said magnet cooling flow channel.

3. The rotary electric machine according to claim 1, wherein a cross-sectional area of said main flow channel perpendicular to an axial direction is larger than a cross-sectional area of said relay flow channel perpendicular to said axial direction.

4. The rotary electric machine according to claim 3, wherein:
   said coolant flow channels each comprise:
   a plurality of said main flow channels;
   one of said magnet cooling flow channels; and
   a plurality of said relay flow channels that link each of said plurality of main flow channels and said magnet cooling flow channel; and cross-sectional areas of said plurality of main flow channels perpendicular to an axial direction are equal, and cross-sectional areas of said plurality of relay flow channels perpendicular to said axial direction are equal.

5. The rotary electric machine according to claim 3, wherein:

said coolant flow channels each comprise:

a plurality of said main flow channels;

one of said magnet cooling flow channels; and a plurality of said relay flow channels that link each of said plurality of main flow channels and said magnet cooling flow channel; and cross-sectional areas of said plurality of main flow channels perpendicular to an axial direction are different than each other, and cross-sectional areas of said plurality of relay flow channels perpendicular to said axial direction are different than each other.

6. The rotary electric machine according to claim 5, wherein said plurality of main flow channels and said plurality of relay flow channels are arranged such that cross-sectional areas thereof increase toward a radially inner side.

7. The rotary electric machine according to claim 1, wherein an aperture area of a flow channel port in said main flow channels when said second end plate is viewed from said second axial end is smaller than an aperture area of a flow channel port in said main flow channels when said first end plate is viewed from said first axial end.

\* \* \* \* \*